United States Patent
Kuschnerus et al.

(10) Patent No.: US 12,503,355 B2
(45) Date of Patent: Dec. 23, 2025

(54) METHOD FOR CALIBRATING A FILLING SYSTEM AND FILLING SYSTEM

(71) Applicant: KROHNE Messtechnik GmbH, Duisburg (DE)

(72) Inventors: Dirk Kuschnerus, Krefeld (DE); Christopher Lüke, Wesel (DE); Sven Walbrecker, Wurster Nordseeküste (DE)

(*) Notice: Subject to any disclaimer, the term of this patent is extended or adjusted under 35 U.S.C. 154(b) by 5 days.

(21) Appl. No.: 18/477,072

(22) Filed: Sep. 28, 2023

(65) Prior Publication Data

US 2024/0101408 A1    Mar. 28, 2024

(30) Foreign Application Priority Data

Sep. 28, 2022   (DE) .................... 10 2022 124 947.6

(51) Int. Cl.
*B67D 9/02*      (2010.01)
*B67D 7/08*      (2010.01)
*G01F 25/10*     (2022.01)
*G01F 25/20*     (2022.01)

(52) U.S. Cl.
CPC ............. *B67D 7/085* (2013.01); *G01F 25/10* (2022.01); *G01F 25/24* (2022.01)

(58) Field of Classification Search
CPC ........ G01F 25/00; G01F 25/0092; B67C 3/02
See application file for complete search history.

(56) References Cited

U.S. PATENT DOCUMENTS

2007/0199365 A1    8/2007   Skowaisa et al.

FOREIGN PATENT DOCUMENTS

| DE | 102010053201 A1 | 6/2012 |
| DE | 102013104707 A1 | 2/2015 |
| DE | 102020129074 A1 | 5/2022 |
| DE | 102020130738 A1 | 5/2022 |
| EP | 2801875 B1 | 4/2018 |

OTHER PUBLICATIONS

Translation of DE 102020130738; Bock Tobias, Doblinger Josef; May 25, 2022.*

* cited by examiner

*Primary Examiner* — Paul J Gray
(74) *Attorney, Agent, or Firm* — Patrick D. Duplessis

(57) ABSTRACT

A method for calibrating a filling system is disclosed. In a first calibration step, a calibration of a calibration variable of a first flow or level measuring device is performed at a first calibration point. In a first deviation determination step, the first control and evaluation unit of the measuring device determines an average deviation of the calibration variable from a desired value. In a first correction step, the first control and evaluation unit corrects a calibration parameter taking into account the determined deviation. In a first transmission step, the first control and evaluation unit transmits the determined deviation and/or the corrected calibration parameter to the second control and evaluation unit. In a first adaptation step, the second control and evaluation unit corrects a calibration parameter at a first calibration point, taking into account the deviation transmitted by the first control and evaluation unit or the transmitted calibration parameter.

6 Claims, 4 Drawing Sheets

METHOD FOR CALIBRATING A FILLING SYSTEM AND FILLING SYSTEM

TECHNICAL FIELD

The invention relates to a method for calibrating a filling system having at least one first filling point and at least one second filling point, wherein the first filling point has at least one first factory-calibrated flow or level measuring device and a first control and evaluation unit, and the second filling point has at least one second factory-calibrated flow or level measuring device and a second control and evaluation unit, wherein the number of factory calibration points of the first flow or level measuring device is greater than the number of factory calibration points of the second flow or level measuring device and/or wherein the dwell time in at least one calibration point in the first flow or level measuring device is greater than the dwell time in at least one calibration point in the second flow or level measuring device, and wherein the control and evaluation unit of the at least first flow or level measuring device and the control and evaluation unit of the at least second flow or level measuring device are at least indirectly connected to each other via a communication channel. The invention also relates to a corresponding filling system.

BACKGROUND

A large number of filling systems are known from the prior art and are used to fill a wide variety of media into containers. For this purpose, filling systems generally have a plurality of filling points, wherein each filling point has at least one filling valve for setting the flow opening, a flow or fill level measuring device for determining the flow rate or a fill level value, and a control and evaluation unit for controlling and monitoring the filling processes of a filling point.

To ensure high filling accuracy, it is necessary to calibrate the flow or level measuring devices installed in the filling system. In practice, it is usual to calibrate the flow or level measuring devices at the factory, i.e. to calibrate them at the manufacturer, and then to recalibrate the factory-calibrated measuring devices at the customer's plant under process conditions. Factory calibration is usually carried out under so-called reference conditions with a reference medium under specified reference parameters, such as a reference temperature and/or a reference pressure. These reference conditions are usually not present in the process, so that the factory calibration is not sufficient.

In order to reduce the factory calibration effort as far as possible, only a few calibration points are usually selected. For example, when calibrating a flowmeter, a few flow values are calibrated. However, there are also devices known as golden sample devices, in which a significantly higher number of calibration points are selected during factory calibration and/or in which the dwell time per calibration point is significantly higher than during standard factory calibration. Accordingly, such devices have a better measuring accuracy than standard calibrated measuring devices.

Process-side calibration is performed both when a filling system is commissioned and when a medium is changed, in order to be able to guarantee the measuring accuracy of the flow or level measuring devices. Since filling systems have many, e.g. several hundred, filling points, and therefore also many flow or level measuring devices, calibration on the process side involves a great deal of effort.

SUMMARY

The object of the invention is to provide a method for calibrating a filling system and a corresponding filling system with which the effort required for calibrating the filling system can be minimized.

In the method according to the invention, the object is achieved by performing the following method steps:

First, in a first calibration step, a calibration of a calibration variable of the first flowmeter or level measuring device is performed at a first calibration point under process conditions. Which calibration variable is calibrated depends in particular on the type of measuring device installed in the filling system. If, for example, a flowmeter is installed, the calibration variable can be the flow rate. If, on the other hand, a level measuring device is installed, the calibration variable can be the fill level.

The same type of measuring device is installed at both the first filling point and the second filling point. Both the first filling point and the second filling point therefore both have a flowmeter or both have a level measuring device. This is not precluded by the fact that the other type of measuring device may be installed at two other filling points.

The method according to the invention is further characterized in that, in a first deviation determination step, the first control and evaluation unit of the first flow or level measuring device determines an average deviation of the calibration variable measured by the first flow or level measuring device from a desired value of this calibration variable at the first calibration point. In a subsequent first correction step, the first control and evaluation unit corrects the at least one calibration parameter taking into account the determined deviation.

According to the method according to the invention, in a first transmission step the first control and evaluation unit transmits the determined deviation in the first calibration point and/or the at least one corrected calibration parameter via the communication channel to the second control and evaluation unit. In addition, in a first adjustment step, the second control and evaluation unit corrects the at least one calibration parameter in a first calibration point taking into account the deviation or the transmitted calibration parameter transmitted by the first control and evaluation unit. The calibration point of the second flow or level measuring device coincides with the calibration point of the first flow or level measuring device. Thus, the calibration parameters are corrected for the same flow or fill level.

Particularly preferably, the second control and evaluation unit confirms receipt of the transmitted data from the first control and evaluation unit.

According to the invention, it has been recognized that the calibration effort can be significantly reduced by not calibrating each individual flow or level measuring device individually. According to the invention, it has been recognized that it is sufficient to calibrate at least one flow or level measuring device and to transmit the calibration data to at least one further flow or level measuring device, which then in turn adjusts its calibration data.

The invention is described here on the basis of two filling points but is readily transferable to a large number of filling points. All that is necessary for the invention is that the first flow or level measuring device or the control and evaluation unit of the first flow or level measuring device is connected via communication channels to the other control and evaluation units of the other flow or level measuring devices so that communication can take place.

In practice, all the filling points in a filling system are designed to be identical, for example they all have a flowmeter or a level measuring device. However, the invention is also readily transferable or applicable to filling systems in which some of the filling points have flowmeters and some of the filling points have level measuring devices. In this case, it is then necessary for those filling points to communicate with each other that have the same type of measuring device.

In a particularly preferred variation of the method according to the invention, the method steps described above are performed at at least one further calibration point. A further calibration point can be, for example, a further flow rate or a further filling level. According to this design, a calibration of a calibration variable of the first flow or level measuring device is thus performed in at least one second calibration step under process conditions in a second calibration point, in at least one second deviation determination step, an average deviation of the calibration variable measured by the first flow or level measuring device from a desired value of this calibration variable at the second calibration point is determined by the first control and evaluation unit of the first flow or level measuring device, in at least one second correction step, at least one calibration parameter is corrected by the first control and evaluation unit, taking into account the determined deviation, in at least a second transmission step, the first control and evaluation unit transmits the determined deviation at the second calibration point and/or the at least one corrected calibration parameter to the second control and evaluation unit via the communication channel, and in at least a second adjustment step, the second control and evaluation unit corrects at least one calibration parameter at a second calibration point, taking into account the deviation transmitted by the first control and evaluation unit or the transmitted calibration parameter.

Particularly preferably, the method steps are carried out in further calibration points, namely most preferably in the factory calibration points of the second flowmeter or level measuring device. To enable an even more accurate calibration, the method steps are carried out in the factory calibration points of the first flowmeter or level measuring device in a further design. Since the number of factory calibration points of the first flowmeter or level measuring device is greater than the number of factory calibration points of the second flowmeter or level measuring device, this further increases the accuracy of the calibration. In particular, this has the advantage that the second flowmeter or level measuring device, or in the event that further flowmeters or level measuring devices are installed in the filling system and integrated into the process, is also calibrated at the same number of calibration points as the first flowmeter or level measuring device. Thus, the method according to the invention enables a very good calibration of all installed flow or level measuring devices with a low calibration effort.

In a particularly preferred design of the method according to the invention, it is provided that the first transmission step for transmitting the deviation in the first calibration point and the at least further transmission step for transmitting the deviation in the second calibration point, particularly preferably additional or all additional transmission steps for transmitting the deviations in several, preferably all calibration points, are carried out in a common overall transmission step at the same time. This requires that all deviations in the corresponding calibration points are determined beforehand. The second control and evaluation unit of the second flow or level measuring device then receives all deviations for the different calibration points and can also perform the adjustment in all calibration points in one overall adjustment step at the same time.

According to the invention, the calibration step can be carried out in different ways. In a particularly preferred first variation of the method according to the invention, a predetermined number of fillings are carried out at the first filling point to calibrate the calibration variable. After each filling, the amount of medium actually filled is determined. In the preferred first variation, the determination of the amount of medium actually filled is carried out by weighing. In a second preferred variation, the determination of the amount of medium actually filled is carried out by measurement with a further flowmeter or level measuring device already calibrated to process conditions. According to the invention, it is then provided that the value of the amount of medium actually filled is compared with the value determined by the flowmeter or level measuring device to be calibrated and the deviation is determined.

A further preferred design of the method according to the invention is characterized in that a standard deviation is determined for determining the deviation in the deviation determination step.

In a particularly preferred design of the method according to the invention, at least one set of coordinates of an optimization curve is corrected as a calibration parameter in the correction step. In a further preferred design, an encoder constant is corrected as a calibration parameter in the correction step. The encoder constant is a parameter that describes a relationship between the raw measured value and the output value.

In one design, the first control and evaluation unit and the second control and evaluation unit are prompted by a higher-level control and evaluation unit of the filling system to perform the method steps.

In addition to the method for calibrating a filling system, the invention also relates to a filling system. The filling system comprises at least one first filling station and at least one second filling station. The first filling station has at least one first factory-calibrated flow or level measuring device with a first control and evaluation unit, the second filling station has at least one second factory-calibrated flow or level measuring device with a second control and evaluation unit. The number of factory calibration points of the first flow or level measuring device is here greater than the number of factory calibration points of the second flow or level measuring device and/or the dwell time in at least one calibration point is greater for the first flow or level measuring device than the dwell time in at least one calibration point for the second flow or level measuring device. In addition, the control and evaluation unit of the at least first flowmeter or level measuring device and the control and evaluation unit of the at least second flowmeter or level measuring device are connected to each other via a communication channel.

In the filling system according to the invention, the object is initially and essentially achieved in that the control and evaluation unit of the first flowmeter or level measuring device and the control and evaluation unit of the second flowmeter or level measuring device are designed in such a way that, during operation of the filling system, they carry out the method steps of the method according to the invention described above. Accordingly, the filling system according to the invention is characterized in that the first control and evaluation unit is designed in such a way that, during operation of the filling system, it carries out a calibration of a calibration variable of the first flowmeter or level measuring device at a first calibration point in a first calibration step under process conditions, that, in a first deviation determination step, it determines an average deviation of the calibration variable measured by the first flowmeter or level measuring device from a desired value of this calibration variable at the first calibration point, that in a first correction step it corrects at least one calibration parameter taking into account the determined deviation, and that in a first transmission step it transmits the determined deviation at the first calibration point and/or the at least one corrected calibration parameter via the communication channel to the second control and evaluation unit. The second control and evaluation unit is correspondingly designed in such a way that, in a first adjustment step, it corrects at least one calibration parameter at a first calibration point, taking into account the deviation transmitted by the first control and evaluation unit or the transmitted calibration parameter.

In further designs according to the invention, the filling system according to the invention is configured in such a way that the first control and evaluation unit and the second control and evaluation unit are further designed that they execute at least one of the further described method steps during operation of the filling system.

All the designs described in connection with the method according to the invention, with their advantages, can be transferred analogously to the filling system according to the invention and apply accordingly.

A further preferred design of the filling system according to the invention is that the first control and evaluation unit and the second control and evaluation unit are designed as subunits of a higher-level control and evaluation unit. In a further design, a higher-level control and evaluation unit is provided which is designed in such a way that it prompts the first control and evaluation unit and the second control and evaluation unit to carry out the described method steps.

In addition, a further design of the filling system according to the invention is characterized in that the communication channel between the first control and evaluation unit and the at least second control and evaluation unit is of wire-bound design. In an alternative design, the communication channel is wireless.

BRIEF DESCRIPTION OF THE DRAWINGS

In detail, there is now a large number of possibilities for designing and further developing the method according to the invention and the filling system according to the invention. In this connection, reference is made to the description of preferred embodiments in conjunction with the drawings.

DETAILED DESCRIPTION

Figure 1:
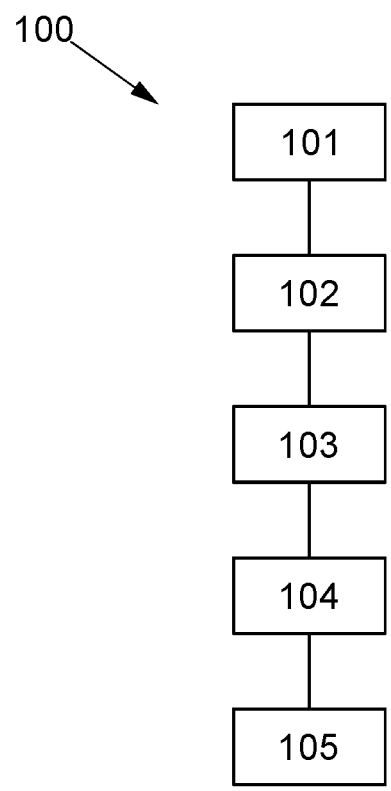
FIG. 1 illustrates a block diagram of a first method for calibrating a filling system.
Figure 3:
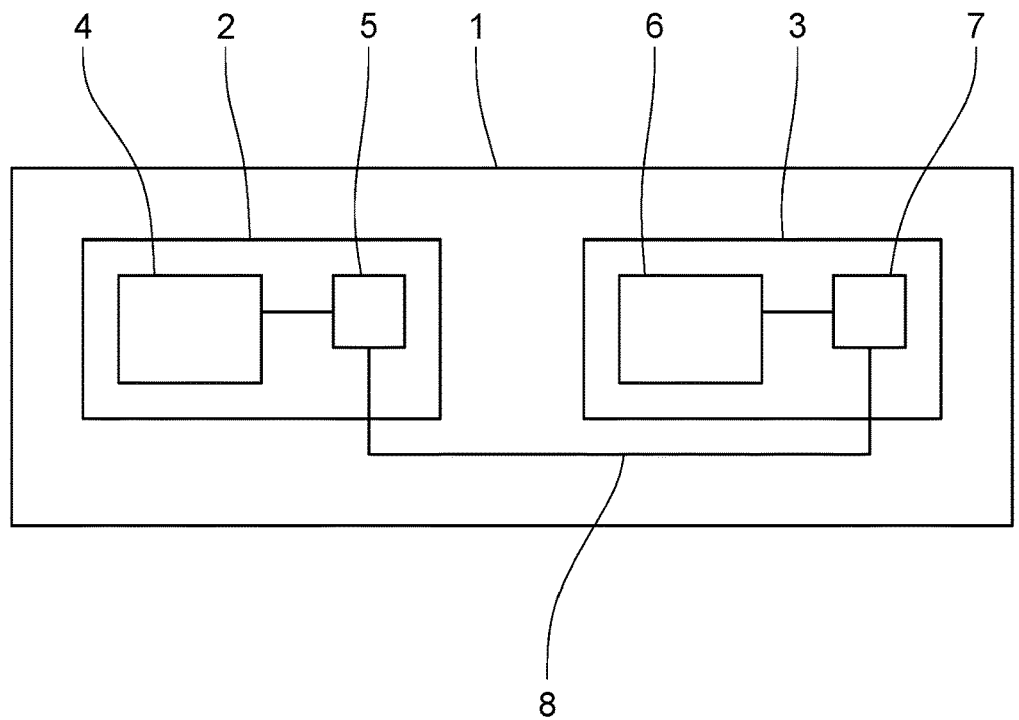
FIG. 3 illustrates a schematic diagram of a first filling system.

FIG. 1 shows a block diagram of a method 100 for calibrating a filling system 1. A corresponding filling system 1 is shown in FIG. 3. The filling system 1 has a first filling point 2 and a second filling point 3. The first filling point 2 has a first factory-calibrated flowmeter 4 with a first control and evaluation unit 5, whereas the second filling point 3 has a second factory-calibrated flowmeter 6 with a second control and evaluation unit 7. In alternative filling systems 1, the measuring devices can be designed as level measuring devices. The first flowmeter 4 is distinguished from the second flowmeter 6 in that the number of factory calibration points of the first flowmeter 4 is greater than the number of factory calibration points of the second flowmeter 6. In addition, in the illustrated embodiment, the dwell time in at least one calibration point, namely a first flow rate, is greater in the first flowmeter 4 than the dwell time in the same calibration point in the second flowmeter 6. As can be seen in the illustration, the control and evaluation unit 5 of the first flowmeter 4 and the control and evaluation unit 7 of the second flowmeter 6 are connected to each other via a communication channel 8. The first control and evaluation unit 5 and the second control and evaluation unit 7 are designed to perform the method 100 shown in FIG. 1, which is described below.

FIG. 1 shows a block diagram of a first embodiment of a method 100 for calibrating a filling system 1. The method 100 shown is preferably performed when a filling system 1 is commissioned or when the medium to be filled is changed. The method 100 is performed under process conditions. In a first calibration step 101, a calibration of a calibration variable of the first flowmeter 4 is performed at a first calibration point. Subsequently, in a first deviation determination step 102, an average deviation of the calibration variable measured by the first flowmeter 4, namely the flow rate, from a desired value of this calibration variable at the first calibration point, namely a first set flow rate value, is determined by the first control and evaluation unit of the first flowmeter 4. In a first correction step 103, the first control and evaluation unit 4 corrects at least one calibration parameter taking into account the determined deviation. Subsequently, in a first transmission step 104, the first control and evaluation unit 4 transmits the determined deviation in the first calibration point and/or the at least one corrected calibration parameter via the communication channel 8 to the second control and evaluation unit 7 of the second flowmeter 6. In a first adjustment step 105, the second control and evaluation unit 7 corrects at least one calibration parameter in the first calibration point taking into account the deviation or the transmitted calibration parameter transmitted by the first control and evaluation unit 7. Thus, an indirect calibration of the second flowmeter 6 takes place on the basis of the transmission of the corresponding data and correction of the corresponding calibration parameter. Thus, the calibration effort of the filling system is considerably reduced.

Figure 2:
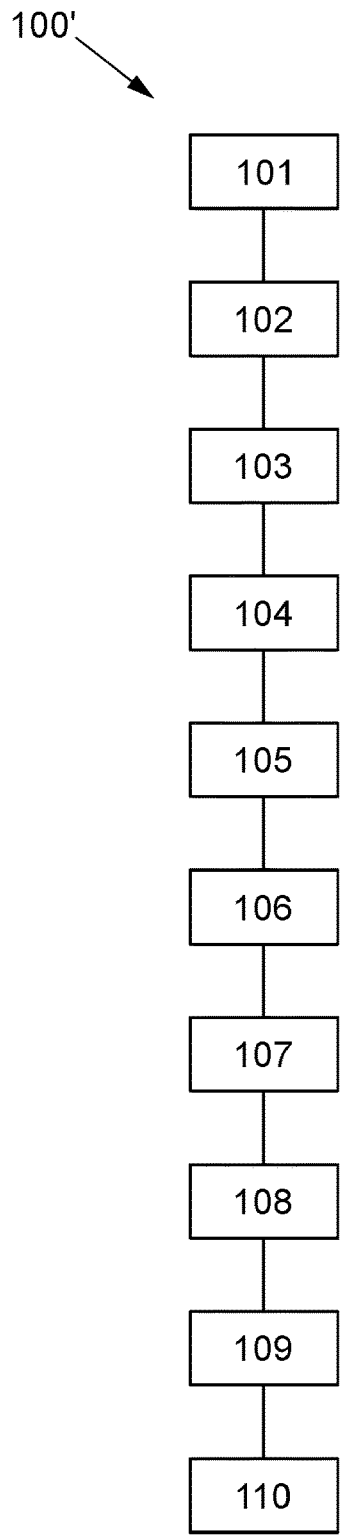
FIG. 2 illustrates a block diagram of a second method for calibrating a filling system.

FIG. 2 shows a block diagram of a second design of a method 100 for calibrating a filling system 1. The method 100 shown in FIG. 2 has further additional method steps 106 to 110 in addition to those already shown in connection with the method 100 shown in FIG. 1. In a second calibration step 106, a calibration of the calibration variable of the first flowmeter 4 is performed at a second calibration point. Here, a second calibration point is another flow rate value. Subsequently, in a second deviation determination step 107, an average deviation of the calibration variable measured by the first flowmeter 4, namely in this case the flow rate, from a desired value of this calibration variable in the second calibration point, namely a second set flow rate value, is determined by the first control and evaluation unit 5 of the first flowmeter 4. In a second correction step 108, the first control and evaluation unit 4 corrects at least one calibration parameter taking into account the determined deviation. Subsequently, in a second transmission step 109, the first control and evaluation unit 4 transmits the determined deviation in the second calibration point and/or the at least one corrected calibration parameter via the communication channel 8 to the second control and evaluation unit 7 of the second flowmeter 6. In a second adjustment step 110, the second control and evaluation unit 7 corrects at least one calibration parameter in the second calibration point taking into account the deviation or the transmitted calibration parameter transmitted by the first control and evaluation unit 7. For the sake of clarity, it is shown that the method 100 is performed for two different calibration points. Preferably, the method 100 is performed in all factory calibration points of the second flowmeter 6 or in all factory calibration points of the first flowmeter 4.

In the calibration steps 101 and 105 for calibrating the calibration variable, a predetermined number of fillings are performed at the first filling point 2. After each filling, the quantity actually filled is determined as the desired value by weighing the quantity filled, and the value of the quantity actually filled is compared with the value determined by the first flowmeter 4. The determination of the deviation in the deviation determination steps 102, 107 is performed by determining a standard deviation. In addition, a transducer constant is corrected as a calibration parameter in the correction steps 103, 108.

Figure 4:
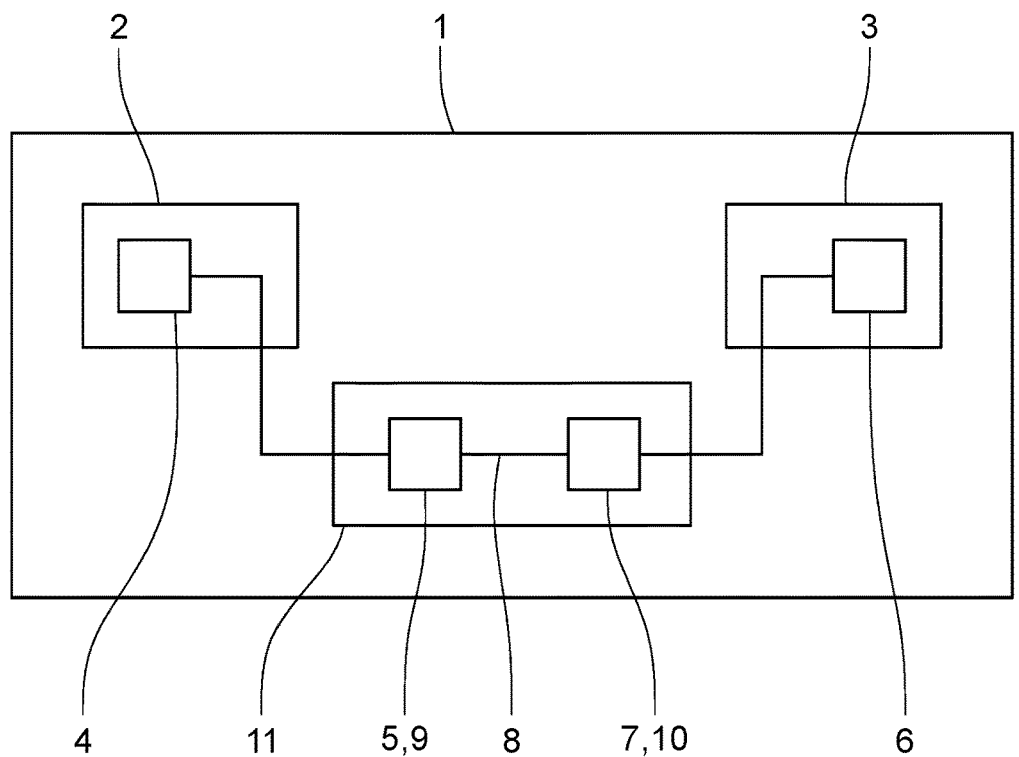
FIG. 4 illustrates a schematic diagram of a second filling system.

FIG. 4 shows a further design of a filling system 1. The filling system 1 shown in FIG. 4 differs from the filling system 1 shown in FIG. 3 and described above in that the control and evaluation unit 5 of the first flowmeter 4 and the control and evaluation unit 7 of the second flowmeter 6 are designed as subunits 9, 10 of a higher-level control and evaluation unit 11. In addition, the communication channel 8 between the first control and evaluation unit 5 and the second control and evaluation unit 7 is wired, whereas the communication channel 8 in FIG. 3 is wireless.

Figure 5:
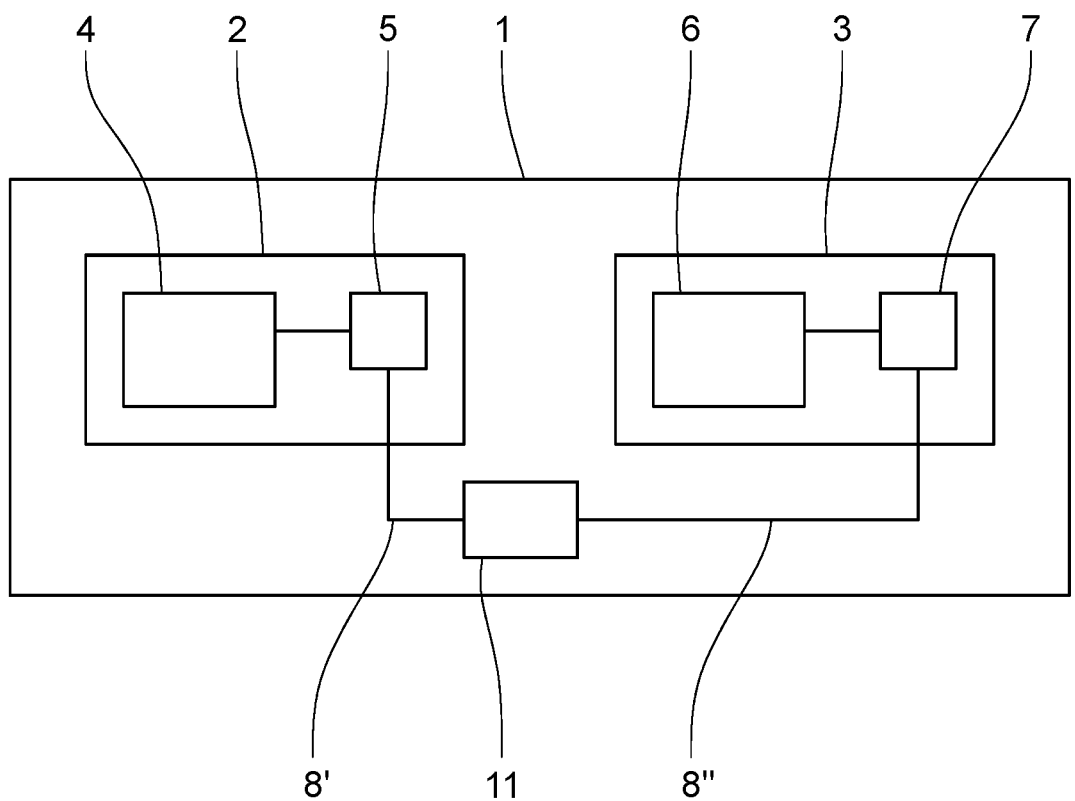
FIG. 5 illustrates a further schematic diagram of a first filling system that includes a higher-level control and evaluation unit.

FIG. 5 shows a further design of a filling system 1, which differs from the filling system shown in FIG. 3 in that a higher-level control and evaluation unit 11 is provided, which is connected via a communication channel 8' to the first control and evaluation unit 5 of the first flowmeter 4 and via a further communication channel 8" to the second control and evaluation unit 7 of the second flowmeter 6. In the illustrated design, the higher-level control and evaluation unit 11 is configured in such a way that it prompts the first control and evaluation unit 5 and the second control and evaluation unit 7 to perform the method steps.

The invention claimed is:

1. A method for calibrating a filling system having at least one first filling point and at least one second filling point, wherein the first filling point has at least one first factory-calibrated flow or level measuring device having a first control and evaluation unit, and the second filling point has at least one second factory-calibrated flow or level measuring device having a second control and evaluation unit, wherein the number of factory calibration points of the first flow or level measuring device is greater than the number of factory calibration points of the second flow or level measuring device and/or wherein the dwell time in at least one calibration point in the first flow or level measuring device is greater than the dwell time in at least one calibration point in the second flow or level measuring device, and wherein the control and evaluation unit of the at least first flow or level measuring device and the control and evaluation unit of the at least second flow or level measuring device are at least indirectly connected to one another via a communication channel, the method comprising:

in a first calibration step, a calibration of a calibration variable of the first flow or level measuring device is performed at a first calibration point under process conditions;

in a first deviation determination step, the first control and evaluation unit of the first flow or level measuring device determines an average deviation of the calibration variable measured by the first flow or level measuring device from a desired value of this calibration variable at the first calibration point;

in a first correction step, the first control and evaluation unit corrects at least one calibration parameter taking into account the determined deviation;

in a first transmission step, the first control and evaluation unit transmits the determined deviation at the first calibration point and/or the at least one corrected calibration parameter to the second control and evaluation unit via the communication channel; and in a first adjustment step, the second control and evaluation unit corrects at least one calibration parameter at a first calibration point, taking into account the deviation transmitted by the first control and evaluation unit or the transmitted calibration parameter.

2. The method according to claim 1, wherein the method steps are performed in at least one further calibration point;
wherein the method steps are performed in the factory calibration points of the second flow or level measuring device; or
wherein the method steps are performed in the factory calibration points of the first flow or level measuring device.

3. The method according to claim 2, wherein at least the first transmission step and the at least second transmitting step are performed in one overall transmission step.

4. The method according to claim 1, wherein, in the calibration step, a predetermined number of fillings are performed at the first filling point for calibrating the calibration variable;
wherein, after each filling, the amount actually filled is determined as a desired value by weighing or by determination with a further flow or level measuring device; and
wherein the value of the amount actually filled, namely the desired value, is compared with the value determined by the flow or level measuring device to be calibrated.

5. The method according to claim 1, wherein a standard deviation is determined for determining the deviation in the deviation determining step.

6. The method according to claim 1, wherein in the correction step at least one pair of coordinates of an optimization curve is corrected as a calibration parameter or a transmitter constant is corrected as a calibration parameter.

* * * * *